United States Patent [19]

Dearman

[11] Patent Number: 4,708,279
[45] Date of Patent: Nov. 24, 1987

[54] INTERNAL ALIGNMENT CLAMP

[76] Inventor: Timothy C. Dearman, 3002 S. Main St., P.O. Box 937, Pearland, Tex. 77588

[21] Appl. No.: 610,199

[22] Filed: May 14, 1984

[51] Int. Cl.⁴ .............................................. B23K 37/04
[52] U.S. Cl. .................................. 228/49.3; 228/44.5; 269/48.1
[58] Field of Search ............................ 228/44.5, 49.3; 269/48.1, 47, 48

[56] References Cited

U.S. PATENT DOCUMENTS 2,878,770  3/1959  Work et al. ..................... 228/49.3
3,197,195  7/1965  Work et al. ..................... 269/34

Primary Examiner—Frederick R. Schmidt
Assistant Examiner—Bradley I. Vaught
Attorney, Agent, or Firm—Learman & McCulloch

[57] ABSTRACT

An internal alignment clamp for use in welding together the confronting ends of a pair of end-to-end pipe lengths comprises a body having an arcuate segment at the opposite ends of which are pivoted a pair of force applying arms movable into and out of engagement with the inner surfaces of such pipes. Mounted on the clamp body is a radially adjustable carriage equipped with a pair of driveable wheels that support the clamp for movement longitudinally of the pipes. An extensible and retractable ram is connected to the force applying arms and to the carriage and is operable to extend the arms and retract the driveable wheels, thereby enabling the arcuate segment of the clamp and the arms to bear against the inner surfaces of the pipes and conform their configurations. An insert is provided to span any gap which exists between the confronting ends of the arms in their expanded positions.

11 Claims, 6 Drawing Figures

INTERNAL ALIGNMENT CLAMP

This invention relates to an expansible and contractable hydraulic alignment clamp adapted to be located within and at the juncture of two confronting pipe lengths and which is operable to reform and align the confronting ends of the pipe lengths to conform to each other in preparation for welding the two lengths together.

BACKGROUND OF THE INVENTION

Large diameter lengths of pipe intended for use as vessels, tanks, or sections of a pipeline normally are cylindrical at the time they are manufactured. However, as such pipe lengths are stored, transported, or conditioned for welding to another length, it is more common than not that the pipe lengths will assume an oval configuration. If the lengths are to be welded together with as little mismatch between their confronting ends as is possible, therefore, the confronting ends of the pipe lengths must be reformed so that their configurations conform to one another. This has been done in the past by welding dogs or clips to the pipe sections adjacent their confronting ends so that wedges and the like can be used to effect relative adjustment of the ends. After two pipe lengths have been secured together, the dogs and clips are burned or ground off, but these practices are time consuming. They also are objectionable since heat stressing of the pipes is possible resulting in permanent damage thereto.

There also have been proposed various kinds of internal alignment clamps which may be fitted within one length of pipe in a position to span the joint between such pipe and another similar pipe. Such clamps are necessarily heavy, cumbersome units and require the expenditure of considerable effort and ingenuity in locating them in proper position relative to the joint between the two pipes. Further, such clamps usually have a gap in expanded condition which prevents full engagement between the clamp and the internal surfaces of the pipes, thereby providing for the possibility of misalignment at the zone of such gap or the discharge of weldment into the pipes through the gap.

SUMMARY OF THE INVENTION

A clamp constructed in accordance with the invention comprises a body having an arcuate segment the surface of which is adapted to bridge the joint between a pair of end-to-end pipe lengths. In circumferential prolongation of the segment are two arcuate force applying arms or limbs pivoted at corresponding ends on the body. The opposite ends of the arms confront one another. A hydraulic operating ram is mounted at one end on the body and extends radially of the latter and is connected to the confronting ends of the arms by a force multiplying toggle linkage so that reciprocation of the ram effects radial expansion and contraction of the arms.

Expansion of the arms results in the provision or enlargement of a gap between those ends of the arms which are coupled to the ram. A spanner may be inserted in such gap to fill the latter and the spanner is radially adjustable so as to cause the radially outer surface of the spanner to be located at a level corresponding to that of the outer surfaces of the arms. The gap between the arms is tapered in a direction transversely of the length of the arms and the spanner is correspondingly tapered so as to enable it to be fitted into the gap even though the length of the latter may vary.

The clamp body is mounted on a frame extending in a direction away from the clamp body and parallel to the axis of a pipe in which the clamp is accommodated. At that end of the frame remote from the clamp is mounted a plurality of radially extending wheels which are adapted to engage the inner surface of a pipe within which the clamp is positioned so as to enable the clamp to be self supporting.

The clamp body is provided with a radially reciprocable carriage on which are mounted powered driving wheels that are movable into and out of engagement with the inner surface of the pipe. The carriage is coupled to the ram which drives the force applying arms in such manner that, when the arms are in radially contracted condition, the driving wheels bear against the inner surface of the pipe and support the clamp for movement longitudinally of the pipe. When the clamp arms are radially extended by the drive ram, however, the carriage automatically is moved to a position in which the driving wheels are withdrawn from engagement with the inner surface of the pipe. The clamp then has only an arcuate segment of its body and the clamp arms in engagement with the pipe.

THE DRAWINGS

A clamp constructed in accordance with a presently preferred embodiment of the invention is disclosed in the following description and in the accompanying drawings, in which.

DETAILED DESCRIPTION

Apparatus constructed in accordance with the invention is especially adapted for use in welding two pipe lengths 1 and 2 of large diameter to one another. For example, the apparatus has been used successfully in welding together pipes of up to eight feet in diameter. There is no known reason, however, that the apparatus could not be used for welding together pipes of even greater diameter. When preparing pipe lengths such as those indicated at 1 and 2 for welding, it is common to chamfer or bevel the end of each pipe and position the chamfered ends in confrontation with one another. Normally, such pipes are supported on spaced apart, powered rollers R as is indicated in FIG. 3 by means of which the pipes may be rotated about their own longitudinal axes.

When the confronting ends of large diameter pipes are placed adjacent one another, it is not uncommon for a mismatch to be present, even though the two pipes originally were of identical diameter. The mismatch usually is due to one or both of the pipes assuming an elliptical, rather than cylindrical, configuration during storage, transport, or other handling. If a proper weld is to be made between the two pipes lengths 1 and 2, therefore, the mismatch must be corrected by reforming one or both of the pipes so that their configurations match as much as possible. Apparatus constructed in accordance with the invention attains such objective.

Figure 3:
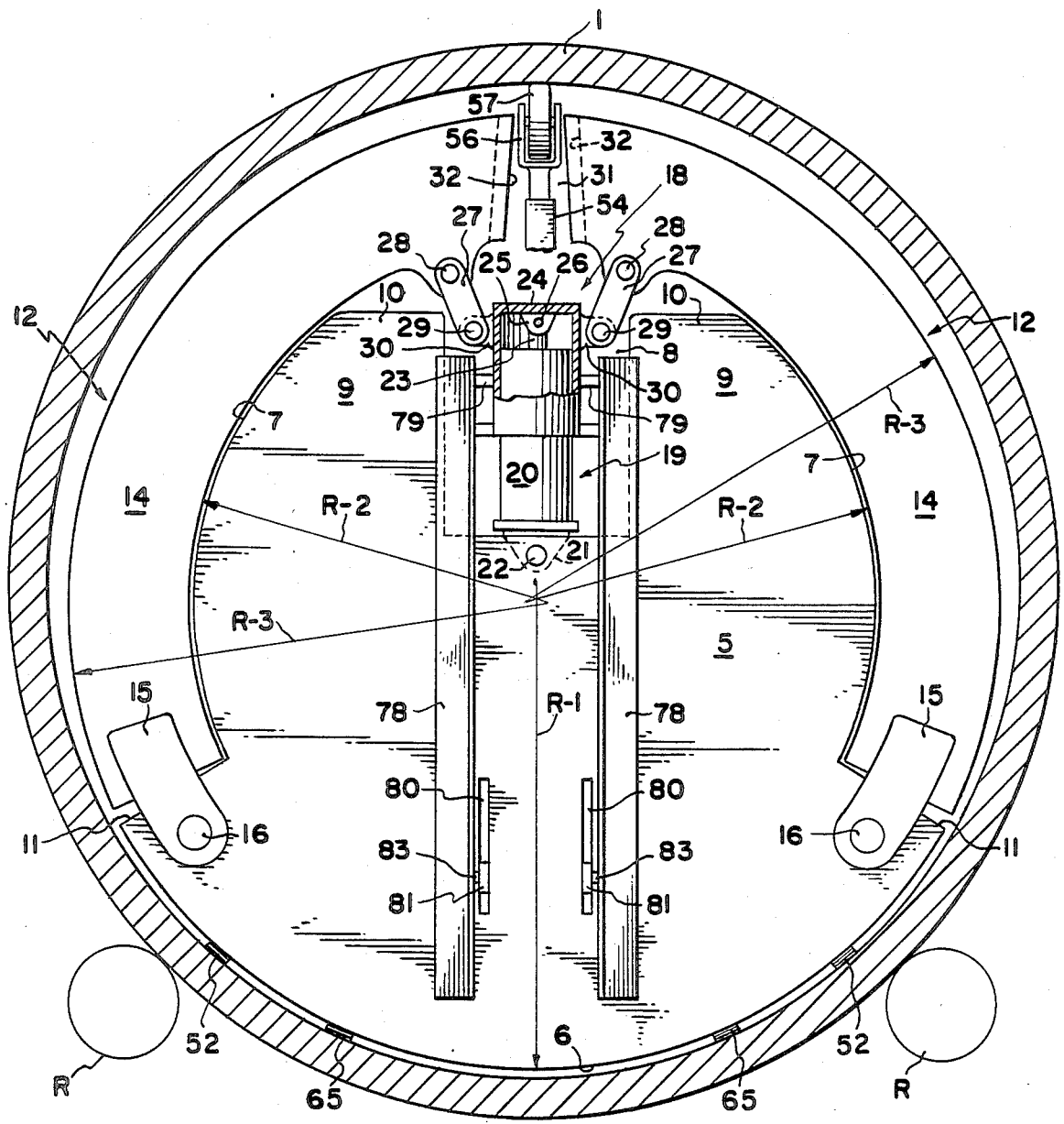
FIG. 3 is an end elevational view, partly in section, of the clamp as viewed in the opposite direction.

A clamp constructed in accordance with the invention comprises a body 3 composed of spaced apart, parallel steel plates 4 and 5 each having an arcuate segment formed on a radius R-1 (FIG. 3). The radius R-1 preferably corresponds substantially to the radius of the pipes lengths 1 and 2 when the latter are cylindrical. The plates 4 and 5 forming the body 3 also are provided with arcuate segments formed on a radius R-2 which is shorter than the radius R-1. Each radius R-2 is of uniform length, but the center of each radius is offset to one side of a center line passing through the center of the body 3. The plates 4 and 5 forming the body 3 are cut diametrally to form a channel 8 flanked by a pair of sections 9. The free ends 10 of the sections 9 are flat as is best shown in FIG. 3.

Between the arcuate surfaces 6 and 7 of the body 3 is a pair of radially extending steps 11 each of which is of such radial dimension as to correspond to the width of one end of an arcuate force applying arm or link 12. Each of the arms 12 is composed of two, spaced apart, parallel steel members 13 and 14 and each has an inner arcuate surface formed substantially on the radius R-2 and an outer arcuate surface formed on a radius R-3 which corresponds in length to the radius R-1, but has its center offset from the vertical center line of the body 3, as is shown in FIG. 3. Each arm 12 has welded thereto one end of a mounting link 15 the opposite end of which is journaled on a pivot pin 16 carried by the body 3. Each arm 12, therefore, extends in prolongation of the arcuate segment of the body 3 and is movable relative to the body between radially expanded and contracted positions.

When the arms 12 are contracted radially, as shown in FIG. 3, the offsetting from the center line of the centers of the radii R-2 and R-3 makes it possible for the outer surface 6 of the body 3 and the outer surfaces of the arms 12 to form a member having an ovate, rather than cylindrical, configuration. Upon radial expansion of the arms, in a manner yet to be explained, the outer surfaces of the body and the arms will form a generally circular member having a diameter corresponding substantially to the inside diameter of the pipes 1 and 2.

Operating means for radially expanding and retracting the arms 12 is designated generally by the reference character 18 and comprises a double acting hydraulic ram 19 having a cylinder 20 accommodated in the space 8. Fixed to the base of the cylinder is a mounting ear 21 that is positioned between the plates 4 and 5 and pivoted thereto by a pin 22. Extending from the upper end of the cylinder 20 is a piston rod 23 that extends into a hollow, rectangular housing 24 and is secured thereto by means of a clevice 25 and pin 26. The housing 24 is in telescoping relation with the cylinder 20 and thus is capable of axial movements relative thereto in response to extension and retraction of the piston rod 23.

The arms 12 and the ram 19 are interconnected by force magnifying toggle links 27, corresponding ends of which are pivoted by pins 28 to the respective arms 12 and the opposite ends of which are pivoted by pins 29 to projections 30 carried by the housing 24. The arrangement is such that the extension of the ram 19 causes the links 27 to move the arms 12 radially outwardly about their respective pivots 16 from the positions shown in FIG. 3 to the positions shown in FIG. 4. When the ram 19 is in its fully extended position, the pivot pins 28 and 29 will lie on a straight line and the arms 12 will be in their position of maximum extension. In such positions of the arms 12 the outer surfaces of the body and the arms will form a true circle except for a gap 31 which lies between the confronting ends 32 of the arms 12. Theoretically, the diameter of the circle formed by the surfaces of the arms 12 when the latter are in their positions of maximum extension should correspond to the inside diameter of the pipes 1 and 2, but in practice the diameter of such circle is a little greater than the inside diameter of the pipes. This difference enables the clamp to compensate for differences in wall thickness between two supposedly identical pipes.

It has been pointed out heretofore that the body 3 is composed of parallel, spaced apart plates and that the arms also are composed of parallel, spaced steel plates. Obviously such members could be formed of single thickness components, but the weight of the clamp would be increased greatly. Further, it is preferred to provide arcuate strips or inserts 33 of copper, or other metal to which weldment does not adhere, between the plates of the body and arms, and at their outer peripheral edges, to fill the space between the plates. The strips removably may be retained in place in any suitable manner.

Figure 4:
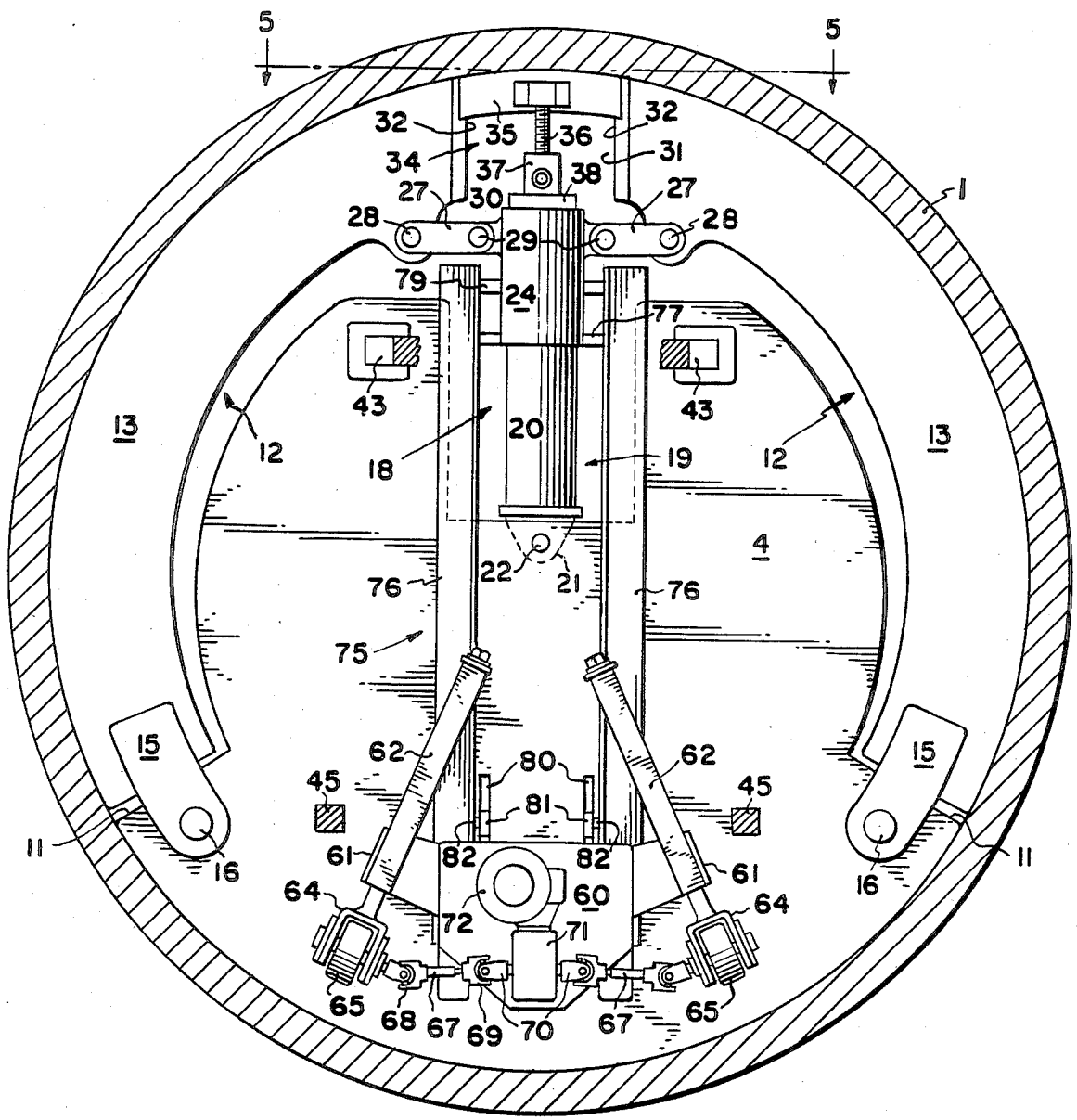
FIG. 4 is a sectional view taken along the line 4—4 of FIG. 1, and illustrating the clamp in expanded condition.

As is apparent from FIG. 4, the gap 31 between the confronting ends 32 of the arms 12 could be substantial when the arms are in their fully extended positions. Should the pipe 1 or 2 be deformed radially inwardly in the region of the gap, therefore, expansion of the arms 12 would not necessarily result in reformation of such pipe at the gap. Accordingly, apparatus constructed in accordance with the invention preferably includes a spanner 34 having a head 35 formed on an arc corresponding to the arc on which the outer surface of each arm is formed. The head has a width at least as great as the thickness of the arms 12 and is secured to a reciprocable support stem 36 of a conventional jack body 37 having a base 38 which removably may be supported on the housing 24.

Figure 5:
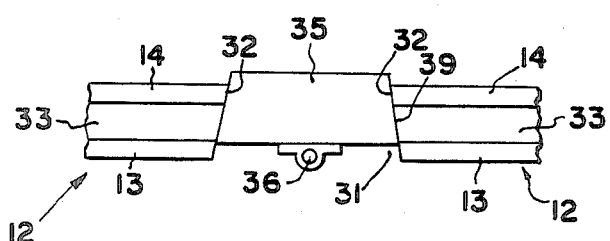
FIG. 5 is a fragmentary plan view illustrating a detail of the apparatus and taken generally along the line 5—5 of FIG. 4.

As is best shown in FIG. 5, the arm-forming plates 13 and 14 are not coextensive in length, but are circumferentially offset so that the gap 31 between the confronting ends 32 of the arms is wedged-shaped in plan view. Accordingly, the ends 39 of the spanner head 35 are inclined so as to form a truncated wedge. The spanner head, therefore, may be wholly or partially accommodated in the gap 31 and form a continuation of the arcuate outer surfaces of the arms 12 and the inserts 33.

A clamp constructed in accordance with the preferred embodiment of the invention includes a frame and supporting wheels by means of which the clamp may be self supporting either in or out of a pipe. Preferably, the wheels are capable of being driven so that the clamp may traverse a pipe of any length.

The frame is designated generally by the reference character 42 and comprises a pair of upper arms 43 welded at corresponding ends to the plate 4 of the body 3. The arms 43 converge rearwardly from the clamp body and are joined to a block 44. The frame also includes a pair of lower, parallel members 45 which are welded at corresponding ends to the member 4 of the body 3 and extend rearwardly therefrom and are joined to plates 46. A crossbar 47 is secured to and spans the lower frame members 45. Upwardly converging braces 48 extend between and are secured to the members 44 and 46.

Figure 2:
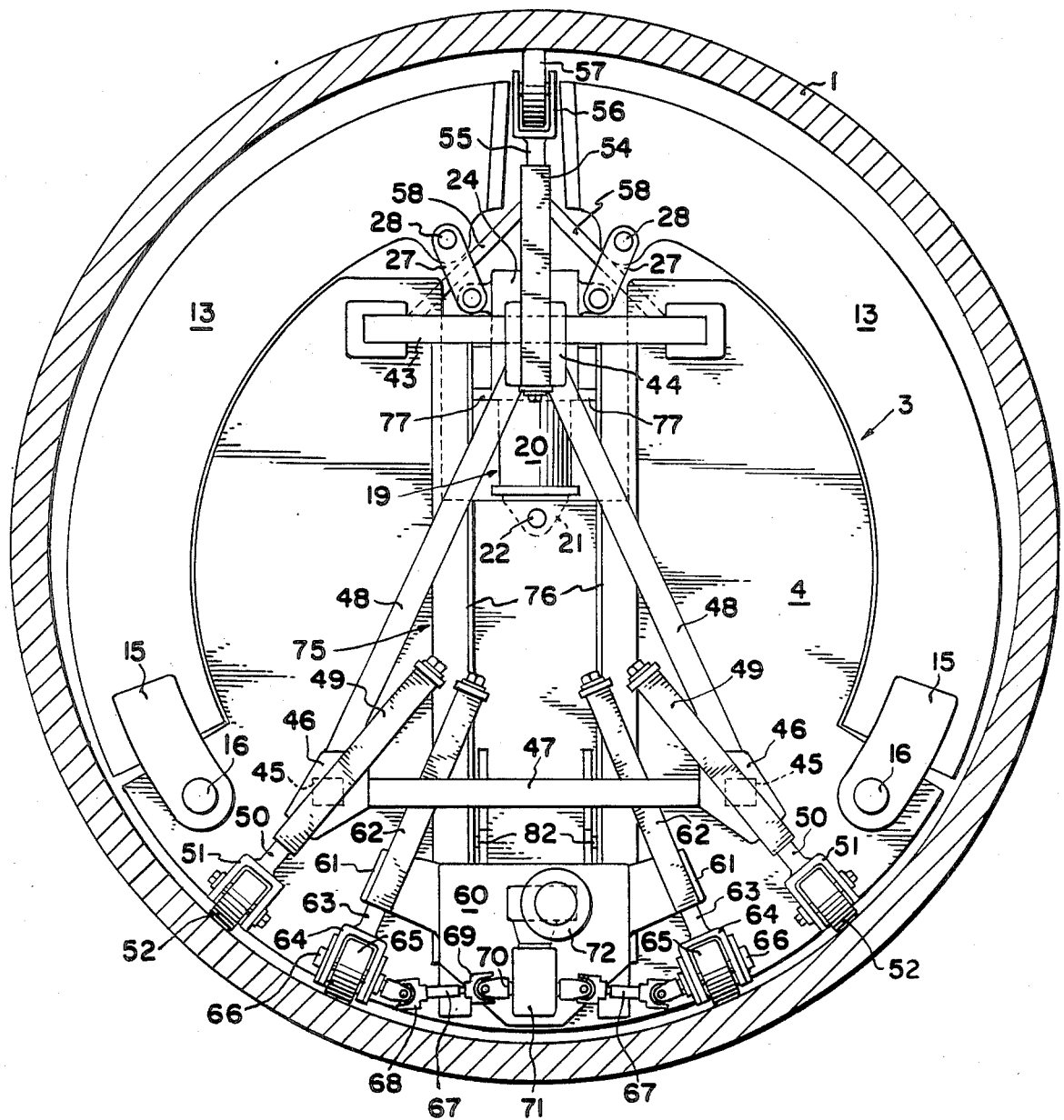
FIG. 2 is an end elevational view of the clamp as viewed from the left-hand end of FIG. 1, but illustrating the clamp inside a length of pipe.

Fixed to the members 46 is a pair of rectangular housings 49 in each of which is mounted a correspondingly shaped support 50 equipped at its lower end with a clevice 51 in which is journaled a wheel 52. As is best shown in FIG. 2 the members 49 and 50 diverge downwardly so that the wheels 52 may engage the inner surface of a pipe at points spaced on opposite sides of a vertical plane passing through the center of the pipe. Preferably, the wheel supports 50 are extensible and retractable axially of the respective housing 49 in any conventional manner.

The frame 42 carries a pair of stablizers 53 at its upper end and each stablizer comprises a preferably square sleeve 54 within which is a reciprocable stem 55 provided at its free end with a clevice 56 in which is journaled a wheel 57. Braces 58 reinforce the sleeves 54. Within each of the sleeves 54 is a spring 59 which biases the associated wheel upwardly. A suitable stop (not shown) reacts between each stem 55 and its associated sleeve 54 to limit the extent to which the wheels 57 may project upwardly.

Adjacent the clamp body 3 is a driving wheel mounting plate 60 having upwardly inclined projections 61 to which are welded rectangular housings 62 like the housings 49 and in which similar wheel supports 63 are mounted. Each support has a clevice at its lower end in which is accommodated a driving wheel 65 that is fixed on an axle 66 journaled in the clevice 64. Each axle 66 is coupled to a drive transmitting shaft 67 by means of universal joints 68, 69 and to a second drive shaft 70 of a transmission 71 that is coupled to and driven by a hydraulic motor 72 supported on the mounting plate 60.

The driving wheel mounting plate 60 is carried by a vertically reciprocable carriage 75 comprising a pair of parallel, diametrally extending frame bars 76 adjacent the body member 4 and straddling the ram 19. At their upper ends the frame bars 76 are secured to the ram housing 24 by connecting bars 77. The carriage 75 also comprises a pair of diametrally extending, spaced apart frame bars 78 which confront the body member 5 and straddle the ram 19. The frame bars 78 also are connected to the ram housing 24 at their upper ends by connecting bars 79. The pairs of frame bars 77 and 78 thus are located on opposite sides of the body 3 and are joined at their upper ends to the housing 24 so as to move with the latter.

For purposes of stabilizing the carriage, the body members 4 and 5 preferably are slotted, as indicated at 80, for the reception of transversely extending bars 81 which are secured at corresponding ends to the frame bars 76 by pins 82 and at their opposite ends to the frame bars 78 by similar pins 83. The driving wheel mounting plate 60 is bolted, welded, or otherwise suitably fixed directly to the frame bars 76 of the carriage 75.

Figure 1:
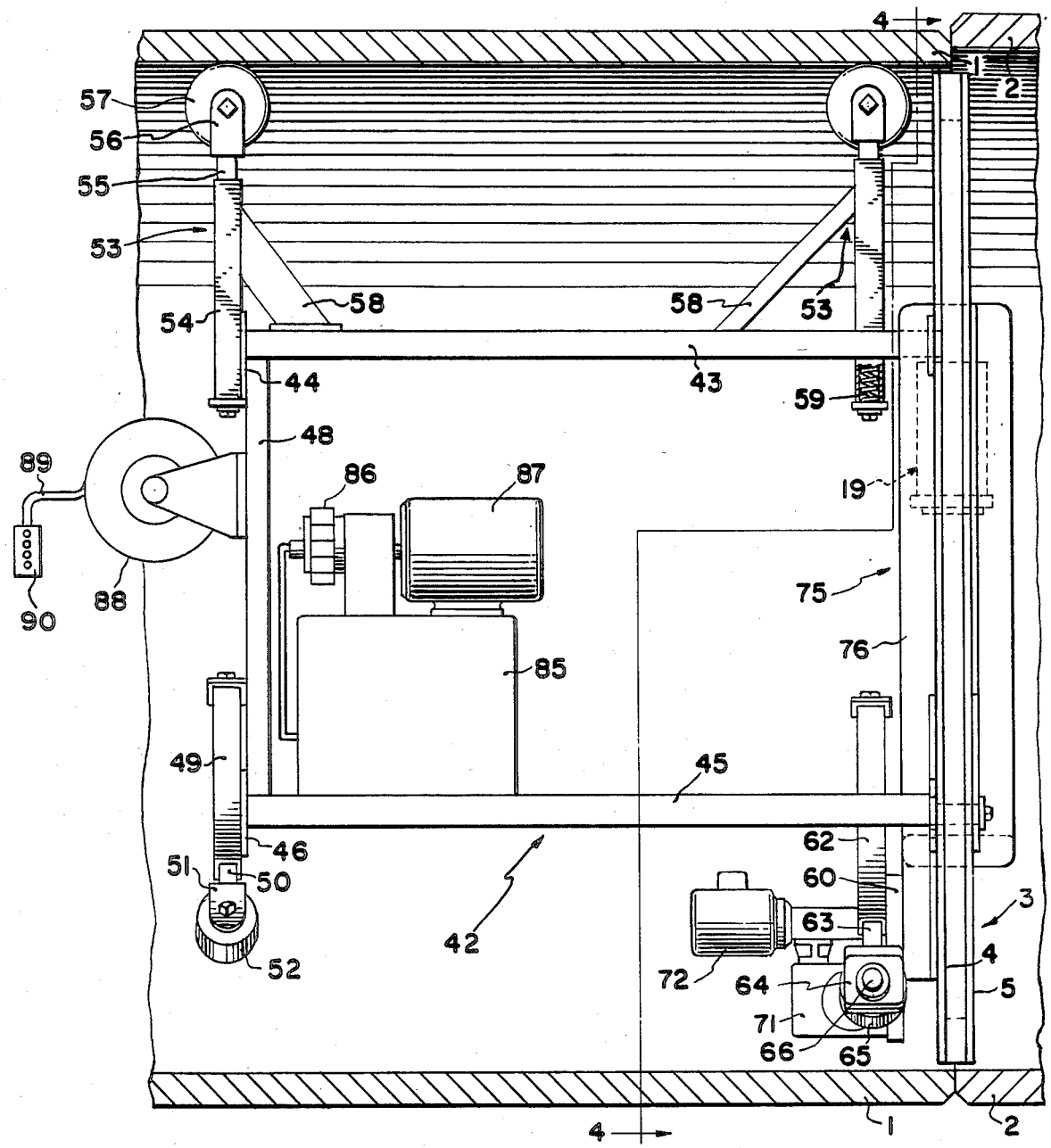
FIG. 1 is a side elevational view of the clamp.

The construction and arrangement of the driving wheel mounting plate 60 and the carriage 75 are such that, when the ram 19 is in its retracted position, as shown in FIGS. 1-3, the carriage 75 is in a downwardly or radially outwardly extended position and the drive wheels 65 project beyond the arcuate surface 6 of the body 3 so as to be able to bear against the inner surface of a pipe and support the clamp in an upright position in conjunction with the wheels 52. When the ram 19 is extended, however, the housing 24 moves upwardly, to the position shown in FIG. 4, thereby causing corresponding movement of the carriage 75 and, consequently, upward or radially inward movement of the drive wheels 65 to a position in which they are radially inward from the peripheral surface 6 of the body 3. The surface 6 of the body, therefore, may rest directly upon the inner surface of the pipe. Thus, expansion of the arms 12 does not subject the wheels 65 to any stresses.

When the drive wheels 65 are in their projected, clamp supporting position and when the arms 12 are contracted, driving of the reversible hydraulic motor 72 in one direction or the other will enable the clamp to be driven longitudinally of a pipe within which the clamp is located. The wheels 57 will be projected by their springs 59 into engagement with the upper inner surface of the pipe and will stablize the movement of the apparatus through the pipe.

Means for operating the ram 19 and the driving wheels 65 may comprise any one of a number of conventional mechanisms. Preferably, however, the frame 42 supports a hydraulic fluid reservoir 85 connected by suitable and conventional conduits (not shown) to the ram 19 and the hydraulic motor 72 and to a pump 86 that is driven by an electric motor 87. A reel 88 also is mounted on the frame 42 and around which is wound a flexible electrical cable 89 provided with a manually operable control box 90 which enables the motor 87, the pump 86, the motor 72, and the ram 19 to be controlled via suitable, conventional valving (not shown). The cable 89 will be connected in a conventional manner to a suitable source of electrical power.

FIG. 1 illustrates the clamp located within the pipe 1 and with the body 3 bridging the joint between the confronting ends of the pipes 1 and 2. As shown, the pipes have a substantial mismatch at their upper ends. In the positions of the parts shown in FIG. 1, the frame 42 is supported by the wheels 52 and 65 and the arms 12 are contracted. Thus, the clamp may be adjusted by operation of the drive wheels 65 to any desired position longitudinally of the pipe 1.

When the clamp is properly positioned relative to the joint between the pipes, extension of the ram 19 will cause the driving wheels 65 to be retracted, as stated above, thereby enabling the surface 6 of the body 3 to lower and bear against the adjacent ends of the pipes 1 and 2. As the ram 19 continues to expand, the arms 12 will move outwardly into engagement with the inner surfaces of the pipes 1 and 2 and gradually reshape or reform the configurations of the latter so that they conform to one another. The mismatch indicated in FIG. 1, therefore, will be eliminated.

If it is necessary or desirable to use the spanner 34, it may be inserted into the gap 31 in a direction transversely of the body 3 and supported atop the housing 24. The stem 36 is adjusted so that the head 35 bears forcibly against the inner surfaces of the pipes 1 and 2. The welding of the pipes 1 and 2 to each other then may be commenced.

If the rollers R are powered, as is preferred, the pipes 1 and 2 may be rotated as they are welded, thereby avoiding the necessity of a welder's having to move around the circumference of the pipes.

Following completion of the weld, the ram 19 may be retracted, whereupon the arms will contract radially and the drive wheels 65 again will be moved into clamp-supporting position against the inner surface of the pipe 1. The drive wheels then may be operated so as to enable the apparatus to traverse the length of the pipe 2 and locate the clamp in a position to make another weld to another pipe.

Figure 6:
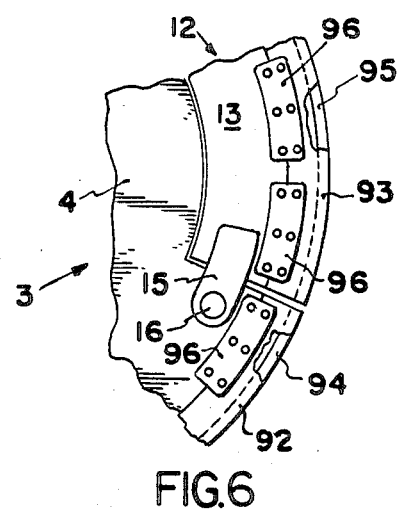
FIG. 6 is a fragmentary view illustrating the use of attachments with the clamp.

Clamps according to the invention may be constructed in a variety of sizes for use with different diameter pipes and vessels. It also is possible, however, to enlarge the size of any such clamp. This characteristic is illustrated in FIG. 6 wherein an arcuate extension 92 is provided for attachment to the body 3 and two extensions 93 are provided for attachment to the arms 12.

The extension 92 is composed of parallel, arcuate plates spaced apart according to the spacing between the plates 4 and 5 of the body 3. At the outer periphery of the two plates forming the extension 92 is a strip 94 of copper or the like which forms a smooth outer surface. The inner and outer radii of the extension 92 are on the center of the radius R-1.

Each of the extensions 93 has parallel, arcuate plates spaced apart like the plates 4 and 5 and between which is a strip 95 of copper or the like at the outer periphery. The inner radius of each plate of the extension 93 corresponds to the radius R-3 and the outer radius has a length corresponding to the outer radius of the extension 92. The centers of the radii of the extensions 93 corresponds to the centers of the radii R-2.

The extensions 92 and 93 are removably maintained on the body 3 and the arms 12 by plate-like members 96 which bridge the body and the arms and are removably secured thereto by bolts or the like. When the extensions are secured to the body and arms, the operation of the clamp is the same as has been described, but the diameter of the clamp is enlarged.

The confronting ends of the extensions 93 adjacent the gap 31 are shaped like the corresponding ends of the arms 12 so as to provide a tapered gap between the extensions. This gap may be filled by the insert 34 in the same manner that it fills the gap 31.

The disclosed embodiment is representative of a presently preferred form of the invention, but is intended to be illustrative rather than definitive thereof. The invention is defined in the claims.

I claim:

1. In an internal alignment clamp having a body, a pair of arms mounted on the body for movements between radially extended and retracted positions, and means reacting between said body and said arms for moving the latter, said arms and said body together forming a generally cylindrical member whose diameter is variable in response to movement of said arms, said arms having confronting ends between which exists a gap when said arms are in extended positions, the improvement wherein the confronting ends of said limbs taper in a direction along the longitudinal axis of said cylindrical member from one side of said cylindrical member toward the other, and an insert movable in said direction into said gap to bridge the latter, said insert having an arcuate outer surface formed on a radius corresponding substantially to that of said cylindrical member, said insert having its ends tapered to conform to the taper of said free ends of said limbs, means for removably supporting said insert in said gap, and means for adjusting said insert diametrally of said member.

2. A clamp according to claim 1 wherein said spanner has a thickness at least as great as that of said gap.

3. In an internal alignment clamp of generally cylindrical configuration and adapted to be accommodated within a pipe, said clamp having radially expansible and contractable force applying means movable into and out of engagement with the inner surface of said pipe, and radially movable operating means for expanding and contracting said force applying means, the improvement comprising wheel means; drive means; means coupling said drive means to said wheel means; means mounting said wheel means and said drive means on said clamp for conjoint reciprocating movements between a radially extended position in which said wheel means projects beyond the periphery of said clamp and a radially retracted position in which the periphery of said clamp projects beyond said wheel means; and means interconnecting said operating means and the mounting means for said wheel means for moving said wheel means between said positions in response to radial movements in opposite directions of said operating means.

4. A clamp according to claim 3 wherein expansion of said force applying means forms a gap in the periphery of said clamp, and including a removable insert occupying said gap.

5. A clamp according to claim 4 including means coupling said insert to said operating means.

6. A clamp according to claim 4 wherein said insert is radially adjustable in length.

7. A clamp according to claim 4 wherein said gap is tapered in a direction from one side of said clamp toward the other.

8. A clamp according to claim 4 wherein said insert is tapered to conform to the taper of said gap.

9. An internal pipe alignment clamp comprising a body; a plurality of arcuate limbs; means mounting said limbs on said body for radially outward and inward movements to and from a position in which said body and said limbs together form a substantially circular member; reciprocable operating means; means coupling said operating means to said limbs for moving the latter to and from said position; supporting wheel means for supporting said body in a pipe and substantially normal to its longitudinal axis; drive means coupled to said wheel means for driving the latter; and reciprocable slide means supporting said drive means and interconnecting said operating means and said wheel means for moving the latter radially of said body into and out of a position in which said wheel means may engage said pipe and support said body within said pipe.

10. An internal alignment clamp of generally cylindrical configuration and adapted to be accommodated in a pipe, said clamp having a body having an arcuate peripheral edge; a pair of arcuate limbs mounted on said body for radially outward and inward movements to and from a position in which said body and said limbs together form a substantially circular member; reciprocable operating means; means coupling said operating means to said limbs for moving the latter to and from said position; at least a pair of supporting wheels projecting radially of said member on opposite sides of a diametral line; means mounting the wheels of said pair for movements between a projected position in which said wheels extend beyond said member for engagement with said pipe and a retracted position in which said wheels are within the confines of said member; means interconnecting said mounting means and said operating means for moving said wheels between said positions in response to movements in opposite directions of said operating means; and power mounted to said interconnecting means and means connected to said wheels for movements therewith and for driving said wheels.

11. A clamp according to claim 10 wherein said power means is reversible.

* * * * *

UNITED STATES PATENT AND TRADEMARK OFFICE
CERTIFICATE OF CORRECTION

PATENT NO. : 4,708,279
DATED : November 24, 1987
INVENTOR(S) : Timothy C. Dearman It is certified that error appears in the above-identified patent and that said Letters Patent is hereby corrected as shown below:

Column 4, line 24, insert -- normally -- after "weldment".

Column 5, line 20, insert -- 57 -- after "wheel".

Column 8, line 63, insert -- means -- after "power".

Column 8, line 64, delete the second occurrence of the word "means".

Signed and Sealed this

Tenth Day of May, 1988

Attest:

DONALD J. QUIGG

Attesting Officer

Commissioner of Patents and Trademarks